United States Patent
Schaede-Bodenschatz et al.

(10) Patent No.: US 12,095,400 B2
(45) Date of Patent: Sep. 17, 2024

(54) DUAL-MOTOR UNIT FOR A FLYWHEEL ENERGY STORAGE SYSTEM WITH A NONLINEAR OVERALL POWER CHARACTERISTIC CURVE

(71) Applicant: ADAPTIVE BALANCING POWER GMBH, Pfungstadt (DE)

(72) Inventors: Hendrik Schaede-Bodenschatz, Darmstadt (DE); Nicolai Meder, Darmstadt (DE); Mario Carroccia, Mühltal (DE)

(73) Assignee: ADAPTIVE BALANCING POWER GMBH, Pfungstadt (DE)

( * ) Notice: Subject to any disclaimer, the term of this patent is extended or adjusted under 35 U.S.C. 154(b) by 59 days.

(21) Appl. No.: 17/995,245

(22) PCT Filed: Mar. 31, 2021

(86) PCT No.: PCT/EP2021/058431
§ 371 (c)(1),
(2) Date: Sep. 30, 2022

(87) PCT Pub. No.: WO2021/198330
PCT Pub. Date: Oct. 7, 2021

(65) Prior Publication Data
US 2023/0170829 A1    Jun. 1, 2023

(30) Foreign Application Priority Data

Apr. 2, 2020    (DE) ..................... 10 2020 204 326.4

(51) Int. Cl.
*H02P 5/48*    (2016.01)
*H02J 15/00*    (2006.01)
*H02K 7/02*    (2006.01)

(52) U.S. Cl.
CPC .............. *H02P 5/48* (2013.01); *H02J 15/007* (2020.01); *H02K 7/025* (2013.01)

(58) Field of Classification Search
CPC .......... H02P 5/48; H02J 15/007; H02K 7/025
See application file for complete search history.

(56) References Cited

U.S. PATENT DOCUMENTS

| | | |
|---|---|---|
| 7,128,037 B2 | 10/2006 | Tumback et al. |
| 2004/0112317 A1 | 6/2004 | Tumback et al. |

(Continued)

FOREIGN PATENT DOCUMENTS

| | | |
|---|---|---|
| CN | 103280873 A | 9/2013 |
| DE | 101 60 481 A1 | 6/2003 |

(Continued)

OTHER PUBLICATIONS

European Patent Office, International Search Report in International Application No. PCT/EP2021/058431 (Jul. 8, 2021).

(Continued)

*Primary Examiner* — Jared Fureman
*Assistant Examiner* — Duc M Pham
(74) *Attorney, Agent, or Firm* — Leydig, Voit & Mayer, Ltd.

(57) ABSTRACT

Disclosed is a dual motor unit for a flywheel mass accumulator, with at least two electric machines coupled to a common rotary body; wherein the electric machines have different power characteristics and the dual motor unit is adapted to provide a total operating power in an operating speed range ($\Omega$) by an interaction of the electric machines. The power characteristic ($P_{max}$) is non-linearly dependent on a rotational speed ($\omega$) of the common rotary body.

16 Claims, 3 Drawing Sheets

(56) References Cited

U.S. PATENT DOCUMENTS

2010/0156222 A1* 6/2010 Jung ............... H02K 7/025
310/152
2020/0106334 A1* 4/2020 Miner ............... H02K 21/222

FOREIGN PATENT DOCUMENTS

| DE | 102011117583 A1 | 5/2012 |
|----|----|----|
| EP | 0 622 264 A2 | 11/1994 |
| GB | 2472297 A | 2/2011 |
| WO | 2015/113562 A1 | 8/2015 |

OTHER PUBLICATIONS

European Patent Office, Written Opinion in International Application No. PCT/EP2021/058431 (Jul. 8, 2021).
International Bureau of WIPO, International Preliminary Report on Patentability in International Application No. PCT/EP2021/058431 (Sep. 29, 2022).

* cited by examiner

DUAL-MOTOR UNIT FOR A FLYWHEEL ENERGY STORAGE SYSTEM WITH A NONLINEAR OVERALL POWER CHARACTERISTIC CURVE

CROSS-REFERENCE TO RELATED APPLICATIONS

This patent application is the U.S. national phase of International Application No. PCT/EP2021/058431, filed on Mar. 31, 2021, which claims the benefit of German Patent Application No. 10 2020 204 326.4, filed Apr. 2, 2020, the disclosures of which are incorporated herein by reference in their entireties for all purposes.

The invention relates to a dual motor unit for a flywheel mass accumulator with at least two electric machines coupled to a common rotary body or body of rotation, which each have different power characteristics or power characteristic curves from one another.

In the context of this application, the term "electrical machine" or "electric machine" can be understood to mean only the electrical machine itself, i.e. rotor, stator with windings and the directly associated mechanical components, or also the rotor, stator with windings together with said associated mechanical components plus frequency converter, control unit and any other components required for the functioning of the electrical machine.

Typically, electrical machines with a power P have an approximately constant torque M over the speed ω, resulting in a linear dependence of the power P on the speed ω, so that the relationship $P=M*\omega$ applies. In many applications and also in the use of electric machines in flywheel mass storage units, a constant power $P_{in}$ is now required during operation, i.e. in a working range of the application. At the same time, the speed range that can be used as the operating range, an operating speed range Ω, should be as wide as possible, i.e. the constant power should be available over as wide an operating speed range as possible.

As a result, the electric machine must have a torque or torque characteristic that enables the constant power $P_{in}$ required in the respective application during operation already at a minimum speed $\omega_{min}$. As a result, the electric machine is then greatly oversized when the constant power $P_{in}$ is provided at higher speeds, for example at a maximum speed $\omega_{max}$, and the maximum possible power at higher speeds is not used in operation, as only a constant power is required in the operating range. Therefore, the electrical machine and other components such as inverters or frequency converters, cables and the like are overdimensioned or oversized.

So far, various possibilities for dealing with the problem described are known. For example, as already indicated, the current for the electric machine can be limited in higher speed ranges of the operating speed range. This has the consequence that the performance of the electric machine and the inverter is not fully utilized, and accordingly an overdimensioning of the respective components such as the frequency converter/inverter is required to achieve the desired operating performance in the lower range of the operating speed range.

Another possibility is the operation of the electric machine in field weakening. By weakening the field in the electric machine, an almost constant power characteristic can be achieved, but this results in high switching losses in the converter, which can be critical, especially during no-load operation at high speeds. However, no-load operation at high speeds is a frequent occurrence in the operation of flywheel mass storage systems.

Another possibility is to design the electric machine for constant power through specific topological effects. In special applications, for example, an approximately constant power characteristic can be achieved by exploiting a design-related widening of the rotor air gap at high speeds and special machine topologies such as synchronous reluctance. The disadvantage of this approach is the extremely complex interaction of a large number of different system components, which is difficult to control. Accordingly, this approach is limited to a few very specific applications.

Approaches are known from the automotive sector, for example DE 10 2011 117 853 A1 and DE 101 604 81 A1, to solve this problem with two electric machines in the driveline, which are switched via a gearbox depending on the operating point of the drive.

As far as the connection of two electrical machines in one device is concerned, this is basically also known from mechanical engineering: For example, an externally excited DC machine can be equipped with an additional excitation machine or excitation winding. In the case of grid-connected synchronous machines, the use of a second electric machine on the same shaft for starting up the synchronous machine is also known. In this case, the second electric machine only provides a starting power which is negligible compared to the operating power during running operation. The use of two electric machines on one shaft is also known, in which one of the machines is designed as a drive and the other electric machine as a generator, in order to realize an efficient division of functions.

In the field of flywheel mass storage systems, which are used to store electrical energy by means of a rotating flywheel mass, there are many limiting conditions with regard to the cooling power that can be dissipated, the installation space, the routing of the power cables and many more, which limit or even exclude the use of the processes described. Such flywheel mass storage devices can be used, for example, to stabilize a supply network voltage. In this case, electrical energy can be stored and retrieved in variable amounts (dynamically) over at least several seconds. Typically, they then have a storage capacity of more than 0.03 kWh. In this context, individually installable sub-storage units with individual storage capacities in the range of, for example, 0.5 kWh to 200 kWh per sub-storage unit can be part of the storage unit. Accordingly, in the context of the present disclosure, flywheel mass storage units are generally stationary flywheel mass storage units that are charged and discharged at the same location (without being moved in between). Such flywheel mass storage units can be used, for example, to stabilize an electrical supply network or to temporarily store electrical energy, which can subsequently be supplied with—preferably high current- to a consumer, for example an electric vehicle.

The invention is thus based on the task of improving known flywheel mass accumulators so that they can absorb and deliver constant power with improved efficiency over as wide an operating speed range as possible.

This task is solved by the objects of the independent patent claims. Advantageous embodiments result from the dependent patent claims, the description and the figures.

One aspect relates to a dual motor unit for a flywheel mass accumulator, having at least two electric machines coupled to a common rotary body. The flywheel mass of the flywheel mass storage unit may be part of the rotary body, or the rotary body may also be the flywheel mass or part of the flywheel mass. The rotary body may also be or comprise a drive shaft, in particular a hollow shaft. The rotary body is preferably configured for operation in an evacuated space and has, for example, components of a magnetic bearing device. The electrical machines may be internal electrical machines ("external rotor") or external electrical machines ("internal rotor"). In the case of external rotors, a drive shaft designed as a hollow shaft, which is then coupled to the rotor of the electric machine, is particularly advantageous. The electric machines each have a stator and an associated rotor coupled to the rotary body. In this case, the electric machines can also have a common stator and/or common rotor, which reduces the number of components required. This can be realized, for example, by means of special winding schemes for stator and/or rotor. The respective individual rotors of the electric machines or the common rotor can be integrated into the rotary body, i.e. in particular arranged overlapping with each other in the axial direction and/or with the rotary body on the drive shaft. Due to the coupling via the common rotary body, the speeds of the electric machine (and of the common rotary body) are linearly dependent on each other, in particular equal, at each operating point of the dual motor unit, which is referred to below as the overall operating point to distinguish it from the individual operating points of the respective electric machines. Accordingly, the various electric machines can be arranged or seated on the same (drive) shaft, as will be explained below. Preferably, the various electrical machines cannot be mechanically decoupled from one another when used as intended; there is then no clutch or the like between the different electrical machines.

The electrical machines each have different power curves or power characteristics or power characteristic curves, which describe the maximum power P of the respective electrical machine as a function of the speed co. The power curves can therefore also be referred to as speed-dependent power curves. The power curves can therefore also be referred to as speed-dependent power curves. The power curves thus indicate the respective maximum power achievable at a maximum current of the electric machine, the maximum power, for a specific speed. According to the known relationships, the power characteristics correspond to the respective torque characteristics of the electrical machines, so that the electrical machines also have different torque characteristics from each other. The different power characteristics result from the specific design of the stator and/or rotor of the respective electrical machines, i.e. the hardware of the electrical machines, as well as from a respective control scheme with which the corresponding electrical machine is operated. Such control schemes can, for example, be stored on a control unit belonging to the electric machine in the form of software.

Accordingly, the various power characteristics of the electric machines can be predetermined, for example, on the hardware side by selected topology of the electric machine and also on the software side by a control unit of the dual motor unit. The design ("hardware") can, for example, result in an electric machine having a power that increases linearly with the speed up to the maximum speed or, on the other hand, going into field weakening at a predetermined limit speed, for example at half the maximum speed.

The share of the various power curves specified by the software can accordingly also be specified in a variable manner. For example, a limit speed $\omega_f$, below which the corresponding electric machine is not operated in field weakening and above which the electric machine is operated in field weakening, can be shifted by the control unit (within limits given for the electric machine by design). Such a control unit can also store, for example in the form of a table or a model, which of the electric machines of the dual motor unit has which efficiency or which losses at which power at a given speed.

The dual motor unit is designed to produce an adjustable total operating power in a predefined operating speed range, i.e. in a running operation characterized by the operating speed range, by interaction of the (preferably different) electric machines. In this context, "adjustable" in the context of the described dual motor unit can also be understood to mean "controllable" or "controllable". In this context, the running operation of the dual motor unit differs from a start-up operation of the dual motor unit; in running operation, the dual motor unit and the associated flywheel mass storage unit fulfill their or its intended use. Accordingly, the operating speed range is the speed range at which the dual motor unit achieves the benefit intended in intended use. Consequently, the different electric machines can be referred to as so-called "controlled" electric machines.

The interaction of the electric machines corresponds to a joint action of the electric machines on the rotary body, which is realized in at least one overall operating point of the dual motor unit. The interaction of the electric machines thus takes place over part or several parts of the operating speed range or continuously over the entire operating speed range.

Here, the total operating power is given by a total power characteristic (curve) resulting from the various power characteristics of the electric machines, and the total power characteristic is nonlinearly dependent on a rotational speed of the common rotary body. In abbreviated form, the total power characteristic which is nonlinearly dependent on the rotational speed of the common rotary body can be referred to as "nonlinear total power characteristic". Accordingly, the total operating power at a total operating point of the dual motor unit is the sum of the powers at the respective operating points of the electric machines. Operating points for the electric machines can be determined, for example, by the speed and power of the electric machine, and possibly also by other operating parameters such as a topology-specific parameter and/or a parameter describing a field weakness of the respective electric machine.

Preferably, (all) the electrical machines of the dual motor unit are designed in such a way that they are always operated in the same function, i.e. either all as a drive for the rotary body or all as a generator on the rotary body. Advantageously, the first and second rotors are also mounted on the common rotary body, in particular on the common (hollow) drive shaft.

The coupling of two electrical machines on a common rotary body (especially a shaft) has the advantage that the available installation space can be better utilized, and also cooling capacity and space for the electrical power cables is better utilized. The use of two electrical machines with different power characteristics or different torque characteristics from each other enables the non-linear overall power characteristic. This can reduce or eliminate current limiting in higher speed ranges of the operating speed range. As a result, frequency converters and power-carrying components such as cables, connectors and bushings can be operated consistently close to their respective design limits in the operating speed range, which in turn reduces electrical losses and required installation space and cooling capacity. Since the individual electrical machines can also be controlled individually, great flexibility is achieved here over a wide speed range.

Inverters or frequency converters of the two electrical machines are advantageously explicitly adapted to the operating mode of the respective machine operated, which leads to a high utilization of the power components. The different electrical machines thus preferably have different inverters, and the inverters are then explicitly adapted to the operating mode(s) and topology of the machine operated in each case.

In an advantageous embodiment, it is provided that a difference in the respective maximum powers that can be generated by the electric machines (at at least one speed that is the same for both machines) is less than 70%, in particular less than 50%, preferably less than 10% of the maximum power of the stronger or strongest electric machine (at the respective speed). In this context, different electric machines can be the respective stronger or most powerful electric machine at different speeds. Thus, for example, one electric machine (A) may be stronger than another electric machine (B) at one speed (1), both electric machines may be equally strong at another speed (2), and the other electric machine (B) may be stronger than the one electric machine (A) at yet another speed (3). The ratios of the maximum powers quantified above in the paragraph preferably apply to at least one speed (i.e. one or more speeds) of the operating speed range, especially preferably in the entire operating speed range. Alternatively, this may also apply to all speeds of the dual motor unit and thus of the electric machines. Preferably, therefore, the maximum outputs of the different electric machines are in the same order of magnitude.

This has the advantage that a particularly high degree of flexibility is achieved in the interaction of the electrical machines, since in contrast to solutions in which, for example, a second electrical machine only provides a starting power and therefore cannot contribute significantly to the operating power, a desired overall operating power can be achieved with a high degree of variability in the participation of the different electrical machines. For example, the electric machine that is to provide the majority of a desired total operating power can thus be freely selected. For example, for a total operating power of 90 kW, 50 kW can be provided by the first electric machine and 40 kW by the second electric machine, but for a total operating power of 110 kW, 50 kW can be provided by the first electric machine and 60 kW by the second electric machine—so the main power of the dual motor unit can be provided by different electric machines, for example according to losses of the electric machines stored in the control unit for different combinations of power and speed. This also increases the efficiency of the dual motor unit.

While achieving the same advantages, it can also be provided that a difference in the efficiency of the electric machines when providing the operating power and thus at at least one same speed is less than 10%, in particular less than 5%, preferably less than 2%. The ratios of the efficiencies quantified here preferably apply to at least one speed (i.e. one or more speeds) of the operating speed range, particularly preferably in the entire operating speed range, or also to all speeds. Advantageously, therefore, the efficiency of the respective electric machines is of the same order of magnitude when providing the operating power. In this respect, too, the dual-motor unit described thus differs from the known applications with a second electric machine as a starting aid for a grid-connected synchronous machine.

In a further advantageous embodiment, it is provided that the operating speed range is specified by a minimum speed greater than zero, for example 2000, 10000 or 30000 rotations per minute, and a maximum speed greater than the minimum speed. Advantageously, the operating speed range comprises more than 30%, in particular more than 50%, of a total speed range of the dual motor unit. The total speed range of the dual motor unit can thereby be predetermined or limited by the maximum power of the dual motor unit. This has the advantage that the non-linear overall performance characteristic is already achieved at low speeds and over a wide working range, the operating speed range, and thus efficiency is increased in this range.

In another, particularly advantageous embodiment, it is provided that the dual motor unit is designed to set a set total operating power by individually specifying a respective operating point for the electric machines, i.e. respective, mutually independent power settings of the electric machines. This applies at at least one speed, i.e. one, several, or all speeds of the operating speed range. The setting of the operating point at the at least one speed of the operating speed range, preferably a speed sub-range of the operating speed range, thereby comprises a setting of a moment-determining current, which may also be referred to as q-current, and/or a field-determining current, which may be referred to as d-current. In particular, setting the operating point at said speed or speeds may also include setting a topology-specific parameter of the electric machine.

Thus, for example, only one of the electrical machines can be operated in field weakening via a suitable selection of the respective currents, or two electrical machines can be operated in field weakening at the same time, which can then lead to the desired total operating power according to the design of the electrical machines. The different electrical machines can thus be set symmetrically, for example both or all in field weakening or all without field weakening, or asymmetrically, for example one electrical machine without field weakening and one electrical machine in field weakening.

This allows the dual motor unit to be further increased in efficiency, since depending on the operating point, for example speed, one electric machine can be operated more efficiently than the other and thus, as described further below, an overall efficiency can be optimized. This is shown by way of example in the following table:

|  | Standard | Optimized |
| --- | --- | --- |
| Target total operating power | 162 kW (=90%) | |
| Machine 1 (max. 100 kW) | 90 kW (=90%) | 100 kW (=100%) |
| Machine 2 (max. 80 kW) | 72 kW (=90%) | 62 kW (=77.5%) |

In the example, a target total operating power of 162 kW, which here corresponds to 90% of the maximum power of the dual motor unit, is not set as usual by providing 90% of the maximum power of each of the first and second machines as their respective operating power. Rather, for example by setting the operating power of the first electric machine to 100% of its maximum power and of the second machine to 77.5% of its maximum power, the same target total operating power of 162 kW is provided, but with an optimized unequal distribution of the total operating power to be provided to the different electric machines. This can be done, for example, based on a table stored in the control unit, which stores the corresponding efficiency of the individual electric machines for the respective operating points, so that the control unit can select the combination of individual operating points with the maximum efficiency here.

Accordingly, it can be provided here that the dual motor unit is designed to set the respective operating points of the different electric machines in such a way that the sum of the electrical losses in the electric machines is minimal at the set or requested total operating power. This applies in particular at at least one speed, i.e. one, several or all speeds of the operating speed range. Thus, the overall efficiency of the dual motor unit is maximized here by balancing the efficiency or the occurring losses of the individual electric machines against each other. Thus, for example, a deterioration in efficiency can be deliberately accepted for one electric machine if this is compensated for by an increase in the efficiency of other electric machines. In the above example, for example, the efficiency of the second machine may decrease by a smaller first amount when the operating power to be produced is reduced to 77.5% of the maximum power, but this would be more than compensated for by an increase in the efficiency of the first electrical machine by a larger second amount when the power to be produced is increased from 90% to 100%.

In a particularly advantageous embodiment, it is provided that the electrical machines comprise at least one permanently excited synchronous machine and/or at least one synchronous reluctance machine and/or at least one asynchronous machine, in particular two permanently excited synchronous machines or one permanently excited synchronous machine in combination with a synchronous reluctance machine or one permanently excited synchronous machine in combination with an asynchronous machine or one synchronous reluctance machine in combination with an asynchronous machine. The electrical machines may also include two asynchronous machines or two synchronous reluctance machines. Alternatively or complementarily, the electrical machines may also comprise one or more electrical machines which are not covered by the above specifications. Preferably, the electric machines are combined in such a way that the lowest possible drag losses occur at the maximum speed of the operating speed range. Thus, the electrical machines may have the same or different topology and thus be based on the same or different operating principles. The possibilities listed have proven to be particularly advantageous in the area of flywheel mass storage.

In a further advantageous embodiment, it is provided that the power curves of the electric machines are (pre)set, in particular can be (pre)set or modified with corresponding software in a control unit, in such a way that an essentially constant or constant maximum power results in the operating speed range according to the overall power curve. A power can be regarded as essentially constant here which deviates in the operating speed range by less than 35%, in particular less than 25%, preferably less than 15%, from the maximum value of the overall power characteristic curve in the operating speed range. This has the advantage that, by means of the known tools for the design of electrical machines in the interaction of the electrical machines as a whole, a dual motor unit with minimized losses can be provided for the dual motor unit, which produces a largely constant power in a given application range.

In another advantageous embodiment, it is provided that at least one, i.e. one, several, or all electric machines are designed in such a way that their torque falls monotonically with increasing speed in a predetermined speed range. In particular, the predetermined speed range can be a subrange of the operating speed range or comprise a subrange of the operating speed range. This sub-range may include at least 30%, at least 60%, or at least 90% of the operating speed range. The subrange may be adjacent to an upper limit of the operating speed range or may comprise the upper limit. In particular, the torque in the operating speed range may have a maximum between the sub-range and the lower limit of the operating speed range, from which it decreases. Below the maximum, the torque may increase with speed. Alternatively, the specified speed range may include the entire operating speed range. This has the advantage that an approximate plateau and thus constant power can be achieved in the overall power characteristic over a wide operating range.

In a further advantageous embodiment, it is provided that at least one electric machine is designed such that its torque is at least substantially constant or constant with increasing speed. This applies in particular at least in the operating speed range. By "essentially constant" can be understood here to be constant up to a predetermined deviation, which can be 35%, 25% or 15%, for example. This has the advantage that an approximate plateau and thus constant power can be achieved in the overall power characteristic over a wide operating range.

In a further advantageous embodiment, it is provided that, according to the overall performance characteristic, the maximum power of the dual motor unit is achieved at a speed which is below the maximum speed of the operating speed range. Preferably, the maximum power of the dual motor unit can be achieved at a speed that deviates by more than 10% or more than 25% from the maximum speed of the operating speed range. This has the advantage that a largely constant maximum power of the dual motor unit results for a particularly large operating speed range.

In a further advantageous embodiment, it is provided that the maximum power of the dual motor unit according to the overall power characteristic curve in the operating speed range maximally deviates by 35% from the power of the dual motor unit at the maximum speed of the operating speed range, in particular maximally deviates by 25% or 15%. The operating speed range can be specified here and also generally in such a way that the values of the overall performance characteristic at the maximum and minimum speeds of the operating speed range are identical. This is particularly advantageous in conjunction with the latter embodiment.

In a further advantageous embodiment, it is provided that the dual motor unit has at least one, i.e. one or more, further electric machines coupled to the common rotary body, with all electric machines having power characteristics that differ from one another. During operation, the speed of all electric machines is thus always linearly dependent on one another, preferably identical. The dual-motor unit is thereby designed to produce, in the operating speed range, through interaction of all electric machines, the total operating power which is predetermined by an overall power characteristic resulting from the different power characteristics of all corresponding electric machines, the overall power characteristic being nonlinearly dependent on the speed of the common rotary body. This applies in the operating speed range in at least one, i.e. one or more operating points, preferably over one or more ranges of the operating speed range, ideally over the entire operating speed range. In this context, the interaction can also vary qualitatively, for example, the interaction of all electric machines in a first sub-range of the operating speed range can comprise an interaction of the first two electric machines, in which the at least one further electric machine does not contribute any power, and in a further sub-range of the operating speed range, different from the first sub-range, can comprise an interaction of one of the first two electric machines with the at least one further electric machine, in which case the other of the first two electric machines does not contribute any power to the overall operating power. For example, in a third sub-range different from the first and second sub-ranges, all of the electric machines can cooperate, and in a fourth sub-range different again from the other sub-ranges, only a single electric machine can provide the desired total operating power. This has the advantage that the overall power characteristic can be specified more precisely, for example a stronger or weaker ripple can be selected, in order to adapt the dual motor unit to specific requirements of the respective application area.

An aspect also relates to a flywheel mass accumulator comprising a dual motor unit according to one of the explained embodiments. Preferably, the flywheel mass accumulator comprises a rotary body disposed in an evacuated space when in use as intended. The rotary body may be supported by a magnetic bearing device.

A further aspect relates to a method for controlling (which, as explained above, can also be understood as regulating) a dual motor unit in a flywheel mass storage unit, the dual motor unit having a common rotary body mechanically coupled to a flywheel mass of the flywheel mass storage unit or comprising the flywheel mass, with at least two electrical machines mechanically coupled to the common rotary body, and the electrical machines each having mutually different power characteristics. Controlling comprises operating the electric machines during ongoing operation of the dual motor unit in accordance with respective individual, i.e. individually (pre)settable, power specifications in such a way that the electric machines, in interaction, produce an overall operating power which is given by an overall power characteristic which results from the different power characteristics of the electric machines and is non-linearly dependent on a rotational speed of the common rotary body.

In particular, it is possible to operate the electric machines in interaction in such a way that the total operating power is achieved with maximum efficiency of the electric machines.

Advantages and advantageous embodiments of the method correspond to advantages and advantageous embodiments of the described dual motor unit and vice versa.

The features and combinations of features mentioned above in the description, including the general part, as well as the features and combinations of features mentioned below in the figure description and/or shown alone in the figures are usable not only in the combination indicated in each case, but also in other combinations without leaving the scope of the invention. Thus, embodiments are also to be regarded as encompassed and disclosed by the invention which are not explicitly shown and explained in the figures, but which arise from the explained embodiments and can be generated by separate combinations of features. Embodiments and combinations of features are also to be regarded as disclosed which thus do not have all the features of an originally formulated independent claim. Furthermore, embodiments and combinations of features are to be regarded as disclosed, in particular by the embodiments set forth above, which go beyond or deviate from the combinations of features set forth in the recitations of the claims.

BRIEF DESCRIPTION OF THE DRAWINGS

Advantageous embodiments are explained in more detail with reference to the following figures. The figures show.

In the various figures, the same or functionally identical components are given the same reference signs.

DETAILED DESCRIPTION OF THE INVENTION

Figure 1:
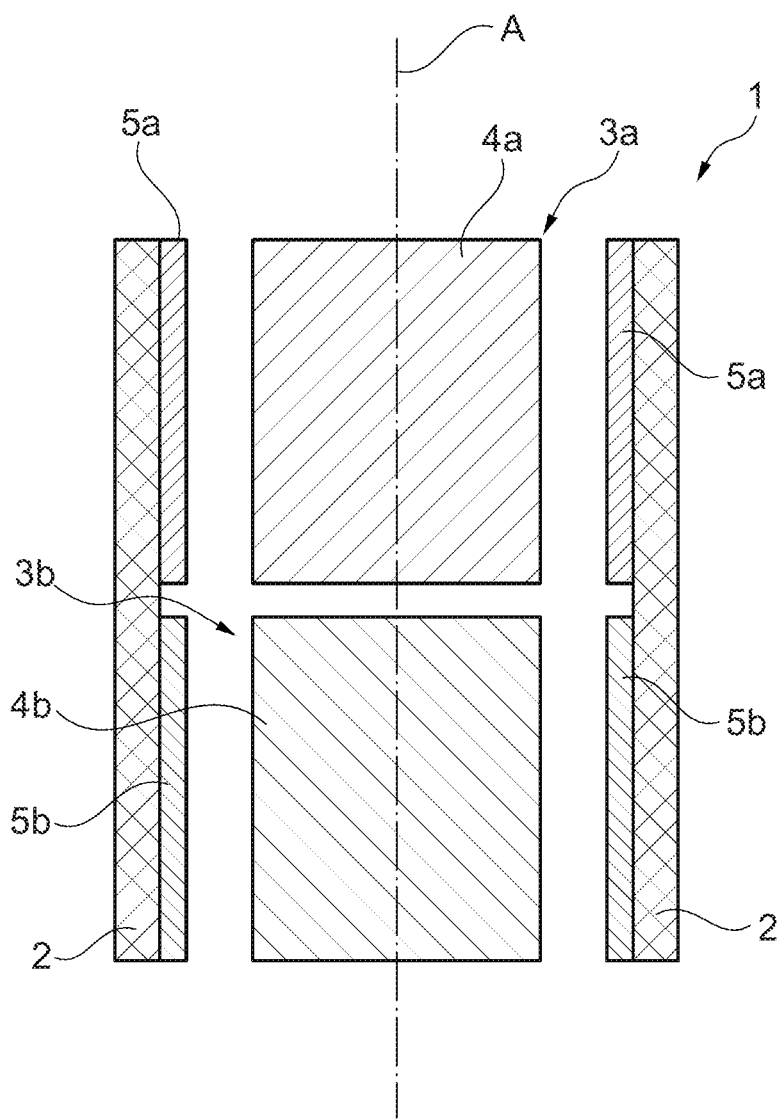
FIG. 1 an exemplary embodiment of a dual motor unit for a flywheel mass accumulator.

FIG. 1 shows a sectional view of an exemplary dual motor unit for a flywheel mass storage system. The dual motor unit 1 has two electric machines 3a, 3b coupled to a common rotary body 2. The electric machines 3a, 3b each have a stator 4a, 4b and a rotor 5a, 5b, which rotate about the common axis of rotation A during operation. In this case, the electric machines 3a, 3b are coupled to the common rotary body 2 with their external rotors 5a, 5b, so that the rotational speed of the two electric machines 3a, 3b is always identical during operation of the dual motor unit 1.

As explained, for example, in the following figures, the electric machines 3a, 3b each have different power characteristics Pa, Pb. Moreover, the dual motor unit 1 is designed to produce a total operating power in an operating speed range S) through interaction of the electric machines 3a, 3b, which is specified by a total power characteristic $P_{max}$ resulting from the different power characteristics Pa, Pb of the electric machines 3a, 3b, and the total power curve $P_{max}$ is not linearly dependent on the (rotational) speed ω of the common rotary body 2.

Figure 2:
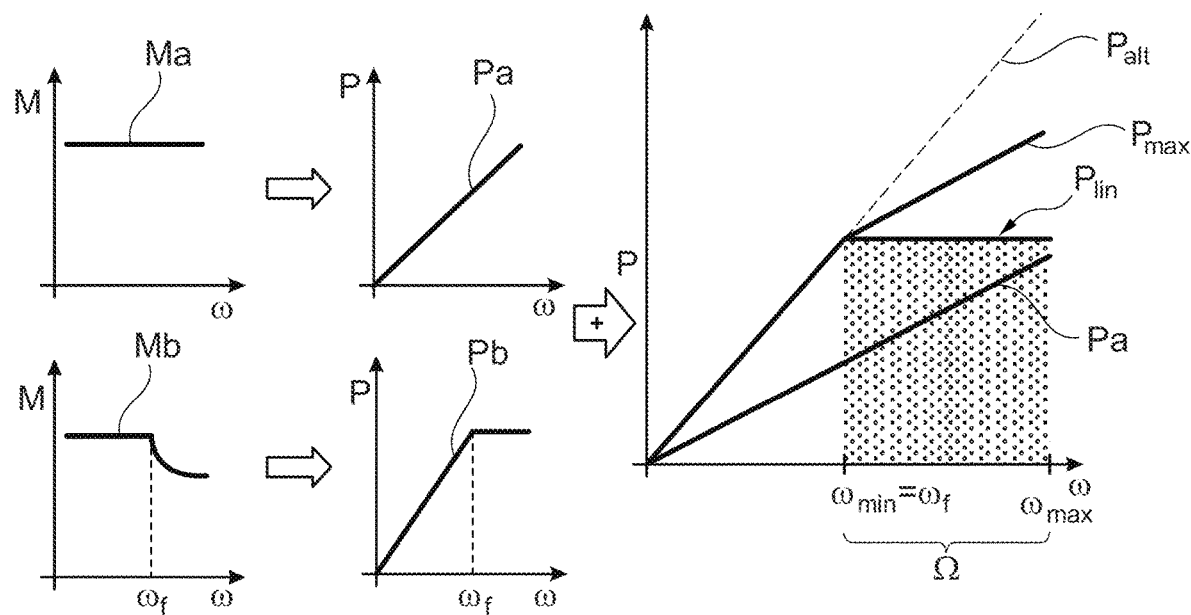
FIG. 2 exemplary first torque characteristics of individual electrical machines including the resulting overall performance curve.

In FIG. 2, two exemplary torque characteristics Ma, Mb for two different electric machines are shown in their dependence on the speed co of the common rotary body. The torque Ma of the first electric machine 3a is constant over the speed ω, which leads to a power P that increases linearly with the speed co and thus to a linear power characteristic Pa. The second electric machine 3b is characterized by the torque characteristic Mb, which is also constant below a limit speed $ω_f$, but drops sharply above it, for example exponentially with increasing speed ω, due to field weakening. The resulting power characteristic Pb is also shown in FIG. 2. Accordingly, the power P of the second electric machine 3b also increases linearly following the power characteristic Pb up to the cutoff frequency $ω_f$ and remains constant above the cutoff frequency $ω_f$.

The interaction of the two electric machines 3a, 3b then results in the total power characteristic $P_{max}$ shown on the right in FIG. 2. With the total power characteristic $P_{max}$, a linear operating power $P_{in}$ is achieved for the operating speed range Ω, which extends from a minimum speed $Ω_{min}$, which is identical to the limit speed $ω_f$, to a maximum speed $ω_{max}$. Thereby, the power characteristic Pa of the first electric machine 3a is plotted in the same graph for comparison to show that this alone cannot provide the desired operating power $P_{in}$. The alternative of a more powerful first electric machine 3a, which has a linear power characteristic and already produces the desired power $P_{in}$ at the speed $ω_{min}$, is drawn in for illustration by the power characteristic $P_{alt}$. It is clear that at higher speeds co of the operating speed range Ω, for example at $ω_{max}$ the current in such an alternative first electric machine would have to be very greatly reduced for a linear power curve, which entails large losses. By combining the two electric machines 3a, 3b and the overall power characteristic $P_{max}$ thus achieved, this effect is significantly reduced, in the present example approximately halved.

Figure 3:
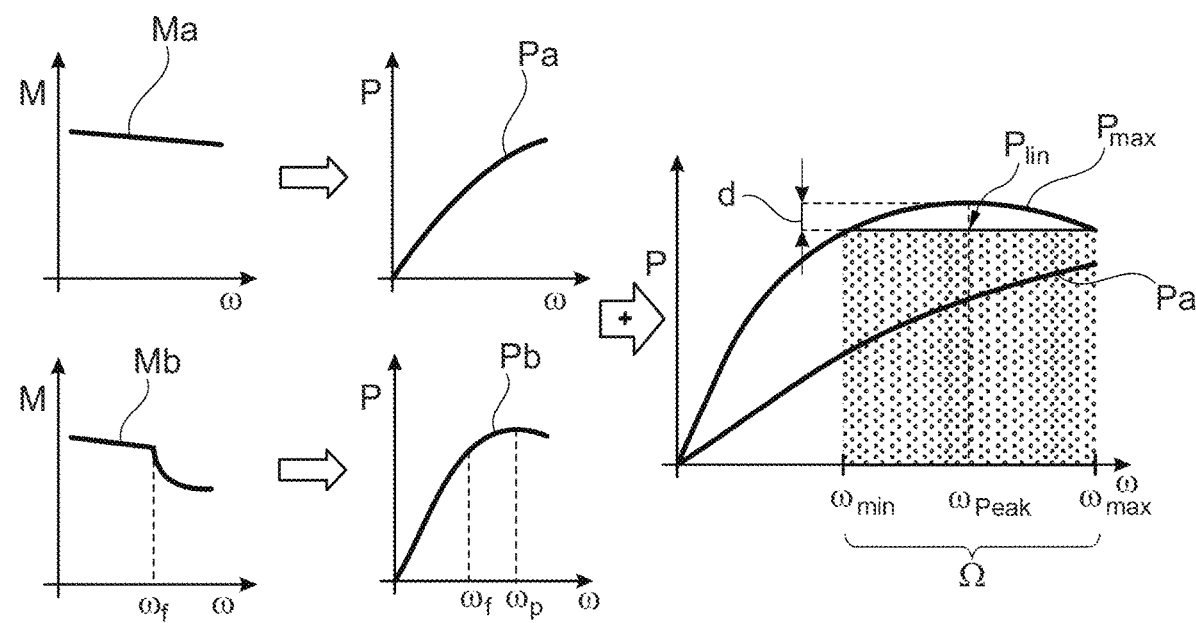
FIG. 3 exemplary second torque characteristics of individual electrical machines including the resulting total power characteristic.

An alternative design of the two electric machines 3a, 3b is exemplarily shown in FIG. 3. There again, the two torque characteristics Ma, Mb of the first and second electric machines 3a, 3b are shown over the speed ω including the resulting power characteristics Pa, Pb. In the example now shown, at least one, in this case even both torque characteristics Ma, Mb are monotonically decreasing. The first torque characteristic Ma falls linearly with the speed ω, which leads to a power characteristic Pa, which rises monotonically with increasing speed, but flattens out with increasing speed ω, i.e. rises less steeply as described by a logarithmic function, for example. The torque characteristic Mb of the second electric machine 3b also falls linearly up to a cutoff frequency $ω_f$, but thereafter falls sharply similar to the example shown in FIG. 2 due to field weakening, so that the resulting power characteristic Pb rises monotonically only up to a certain frequency $ω_p$, but falls monotonically above the speed $ω_p$. Here, the speed $ω_p$ is larger than the speed $ω_f$.

A combination of the two electric machines now results in the total power curve $P_{max}$ shown on the right in FIG. 3. Again, the individual power characteristic Pa of the first electric machine 3a is also drawn in for illustration purposes. This shows that the desired linear operating power $P_{in}$ could not be efficiently achieved with the first electric machine 3a alone. Thereby, the total power characteristic $P_{max}$ reaches its maximum value at a speed $ω_{Peak}$. This speed $ω_{peak}$ is greater than the speed $ω_p$ at which the power characteristic Pb of the second electric machine 3b reaches its maximum value. Overall, the interaction of the two electric machines 3a, 3b with the respective torque characteristics Ma, Mb and the power characteristics Pa, Pb thus results in an overall power characteristic $P_{max}$ which is very flat in the operating speed range Ω and can therefore be used efficiently for a linear operating power in the entire operating speed range a Ω. In the present case, the value of the total power characteristic $P_{max}$ for the limits of the operating speed range Ω, $ω_{min}$ and $ω_{max}$, corresponds to the value of the desired operating power $P_{lin}$ for operating speed range Ω. This ensures that the deviation of the maximum value of the total power characteristic $P_{max}$ at speed $ω_{peak}$ deviates only minimally from the desired operating power $P_{in}$. For example, the corresponding deviation d can be less than 25% or even less than 15%. In the example shown in FIG. 3, it is about 10% of the desired operating power $P_{in}$. This also allows the other components to be optimally adapted to the operating power $P_{in}$ to be provided, so that cooling power, electrical losses and the like are also optimized, so that overall the efficiency of the dual motor unit 1 and thus of an associated flywheel mass storage unit is optimized.

The invention claimed is:

1. A dual motor unit for a flywheel mass accumulator which serves to store electrical energy by a rotating flywheel mass, with at least two electric machines directly coupled to a common rotary body, the rotary body being part of the flywheel mass or the flywheel mass being part of the rotary body; wherein
the electric machines each have power characteristics different from one another; and
the dual motor unit is designed to provide a total operating power in an operating speed range (Ω) by an interaction of the electric machines, wherein the total operating power is determined by a total power characteristic ($P_{max}$) resulting from the different power characteristics of the electric machines, and the total power characteristic ($P_{max}$) is non-linearly dependent on a rotational speed (ω) of the common rotary body; and the operating speed range (Ω) is predetermined by a minimum speed ($ω_{min}$) greater than zero and a maximum speed ($ω_{max}$) greater than the minimum speed ($ω_{min}$) and comprises more than 30% of a total speed range of the dual motor unit.

2. The dual motor unit according to claim 1, wherein a difference in the respective maximum powers which are produced by the electric machines at an identical rotational speed (ω) is less than 70% of the maximum power of the more powerful electric machine.

3. The dual motor unit according to claim 1, wherein the operating speed range (Ω) is predetermined by the minimum speed ($ω_{min}$) greater than 2000 rotations per minute.

4. The dual motor unit according to claim 1, which is adapted to adjust a set total operating power by individually setting a respective operating point for the electric machines, wherein the setting of the operating point comprises setting a moment-determining current and a field-determining current.

5. The dual motor unit according to claim 4, wherein the dual motor unit is designed to set the respective operating points of the different electric machines such that the sum of the electric losses in the electric machines is minimal at the set total operating power.

6. The dual motor unit according to claim 1, wherein the power characteristics (Pa, Pb) of the electric machines are predetermined in such a way that a substantially constant maximum power results in the operating speed range according to the overall power characteristic ($P_{max}$).

7. The dual motor unit according to claim 1, wherein at least one electric machine is designed in such a way that its torque falls monotonically in a predetermined speed range with increasing speed (ω).

8. The dual motor unit according to claim 1, wherein at least one electric machine is designed such that its torque is at least substantially constant with increasing speed (ω).

9. The dual motor unit according to claim 1, wherein according to the total power characteristic ($P_{max}$) the maximum power of the dual motor unit is achieved at a speed which is below the maximum speed of the operating speed range.

10. The dual motor unit according to claim 1, wherein at least one further electric machine is coupled to the common rotary body, wherein
all electric machines have mutually different power characteristics (Pa, Pb); and
the dual motor unit is designed to provide the total operating power in the operating speed range (Ω) by interaction of all electric machines, which is predetermined by a total power characteristic ($P_{max}$) resulting from the different power characteristics (Pa, Pb) of all electric machines, and the total power characteristic ($P_{max}$) is non-linearly dependent on the speed (ω) of the common rotary body.

11. A flywheel mass accumulator with a dual motor unit according to claim 1.

12. The dual motor unit according to claim 1, wherein the minimum speed ($ω_{min}$) greater than 10000 rotations per minute.

13. The dual motor unit according to claim 1, wherein the minimum speed ($ω_{min}$) greater than 30000 rotations per minute.

14. The dual motor unit according to claim 1, wherein the operating speed range (Ω) comprises more than 50% of the total speed range of the dual motor unit.

15. A method for controlling a dual-motor unit in a flywheel mass accumulator which serves to store electrical energy by a rotating flywheel mass, the dual-motor unit having a common rotary body coupled to a flywheel mass of the flywheel mass accumulator or a common rotary body comprising the flywheel mass, and having at least two electric machines directly coupled to the common rotary body, and the electric machines each having mutually different power characteristics (Pa, Pb) with operating the electric machines during ongoing operation of the dual motor unit in accordance with respective individual power specifications in an operating speed range (ω) in such a way that the electric machines in interaction produce a total operating power which is predetermined by a total power characteristic ($P_{max}$) resulting from the different power characteristics (Pa, Pb) of the electric machines (3a, 3b) and which is non-linearly dependent on a rotational speed (ω) of the common rotary body; wherein the operating speed range (ω) is predetermined by a minimum speed ($ω_{min}$) greater than zero and a maximum speed ($ω_{max}$) greater than the minimum speed ($ω_{min}$) and comprises more than 30% of a total speed range of the dual motor unit.

16. The method according to claim 15, wherein the electrical machines, when operating in interaction, provide the total operating power with maximum efficiency.

\* \* \* \* \*